United States Patent [19]

Goward

[11] Patent Number: 4,570,980
[45] Date of Patent: Feb. 18, 1986

[54] STAPLE COUPLING

[75] Inventor: Stanley H. Goward, Salisbury, United Kingdom

[73] Assignee: BTR plc, London, United Kingdom

[21] Appl. No.: 500,882

[22] Filed: Jun. 3, 1983

[30] Foreign Application Priority Data

Jun. 7, 1982 [GB] United Kingdom ................ 8216506

[51] Int. Cl.$^4$ ............................................. F16L 37/00
[52] U.S. Cl. .................................... 285/305; 285/321; 285/314; 285/83; 285/403
[58] Field of Search ............... 285/305, 306, 307, 321, 285/314, 83, 351, 304, 403

[56] References Cited

U.S. PATENT DOCUMENTS 3,490,795 1/1970 Hennlich ............................. 285/305
4,059,295 11/1977 Helm ................................... 285/305

*Primary Examiner*—Richard J. Scanlan, Jr.
*Attorney, Agent, or Firm*—Watson, Cole, Grindle & Watson

[57] ABSTRACT

A staple coupling of the kind comprising interfitting male and female members for the connection of a hose within a fluid system, the members including respective external and internal circumferential grooves which register with one another when the members are fully engaged and holes on the female member to receive a staple, the holes being positioned and arranged so that when the staple is inserted into the holes the staple engages the registering grooves on the members to prevent separation of the members; a sealing O-ring provided on at least one of the members to provide a fluid tight seal between the members, and a generally U-shaped staple to prevent separation of the members; wherein at least one of the staple, the circumferential groove and the holes to receive the staple is shaped so as to allow limited axial movement of the male and female members in a separating direction to a locked position when the staple is fully inserted whereby the staple cannot be removed until the members are moved back to their unlocked position, and wherein a biasing O-ring is provided to urge the members to the locked position in use.

10 Claims, 11 Drawing Figures

STAPLE COUPLING

The invention relates to staple couplings which are well known and have been used for many years. Typical applications of these are in the mining industry where they have been used with advantage for the connection of high pressure hydraulic hose assemblies, although they can be used with other fluid media.

BACKGROUND TO THE INVENTION

The invention relates particularly to a staple coupling of the kind comprising interfitting male and female members for connection of hose within a fluid system, sealing means provided on at least one of the members to provide a fluid tight seal between the members and means to prevent separation of the members comprising external and internal circumferential grooves on the members respectively which register with one another when the members are engaged and holes on the female member to receive a staple, the holes being positioned and arranged so that when the staple is inserted into the holes the staple engages the registering grooves on the members to prevent separation of the members.

One example of such a staple coupling is described in British Pat. No. 1,253,981.

The prior art couplings provide a high measure of safety, and in most cases the higher the pressure within the coupling the more difficult it is to remove the staple from the holes. Removal of the staple at low pressures would require a low order of energy release, and whilst using a normal hydraulic medium even with a large quantity of stored energy from accumulators, the hazard of removing the staple is considered tolerable at pressures at which the staple can be removed.

However, with other fluid media such as hot hydraulic fluid, chemically dangerous fluids and gases, steam, etc., the potential hazards of release of the coupling whilst there is pressure inside the coupling has to be considered more carefully. For example, if one were to disconnect, large bore air hose from an air compressor receiver before complete air exhaustion, there would be considerable danger, particularly because of the possibility of "jet-flailing" of the hose.

The invention seeks to provide a more efficient locking means for a staple coupling.

SUMMARY OF THE INVENTION

The invention provides a staple coupling of the kind described in which at least one of the staple, the circumferential groove and the holes to receive the staple is shaped so as to allow limited axial movement of the two coupling members in a separating direction to a locked position when the staple is fully inserted whereby the staple cannot be removed until the members are moved back to their unlocked position, means being provided to urge the members to the locked position in use.

The means aforesaid may be simply means which employ the fluid pressure within the coupling or there may be provided resilient means to act between the coupling members. The resilient means may be provided by the sealing means itself or separate and additional resilient means may be provided.

A preferred resilient means comprises a resilient ring which is forced to roll along the cylindrical surface on one member by relative axial movement of the member as the two members are connected whereby the ring tends to separate the two members to regain its natural shape.

Preferably the surface is tapered and the ring is engaged by a cylindrical tapered surface on the other member having an opposite taper.

The tapered surfaces are preferably provided internally on the female member and externally on the male member.

It is preferred that the axial movement of the members to the locked position is provided by a recess or recesses on the staple which may allow the staple to engage a recess or recesses adjacent one of the circumferential grooves.

Preferably the groove is provided on the male member.

It is also preferred that the holes for receiving the staple are provided on a portion of the female member which is rotatable relative to the rest of the member to allow insertion of the staple at any position of rotation of the female member.

A specific example of a staple coupling according to the invention and some variations thereto will now be described with reference to the accompanying drawings.

BRIEF DESCRIPTION OF THE DRAWINGS

FIGS. 7-11 show a number of variants of the shape of the staple coupling and groove; FIGS. 7a-11a showing the members in the position where the staple can be withdrawn and FIGS. 7b-11b showing the position where the staple cannot be withdrawn.

DESCRIPTION OF THE PREFERRED EMBODIMENTS

Figure 1:
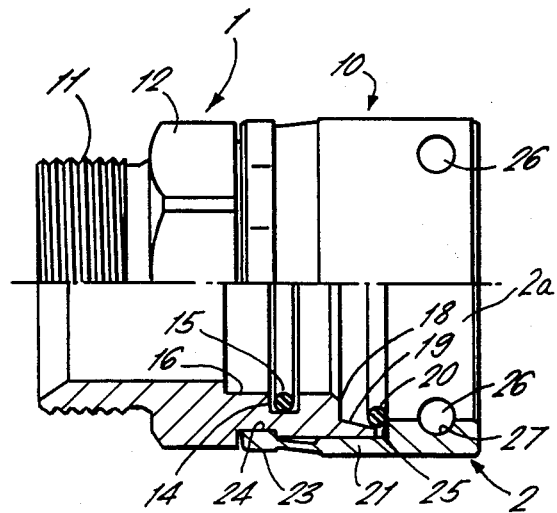
FIG. 1 is a view, partly in axial cross-section, of the female member.
Figure 2:
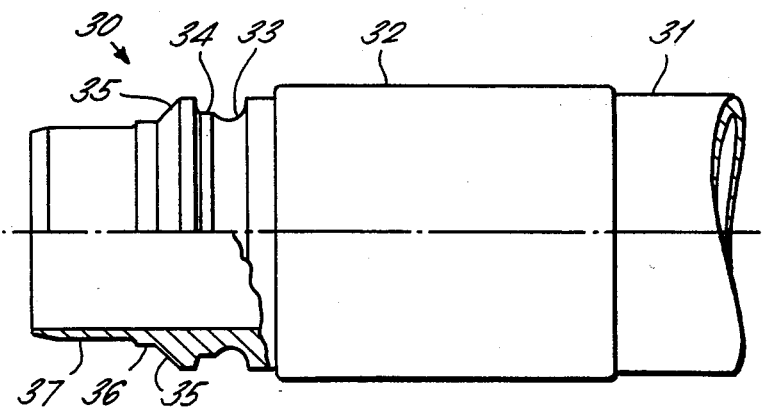
FIG. 2 is a view, partly in axial cross-section, of the male member.

Referring first of all to FIGS. 1 and 2, the female member 10 has a body member 1 and a housing member 2. The body member is provided with an external screw thread 11 for attachment to a housing or the like, although it could alternatively be provided with means for attachment to another length of hose. The body member 1 is also provided with a hexagon nut 12 to allow the member to be tightened onto the housing.

Internally the body member is provided with a groove 14 which receives an O-ring 15. These are provided on a portion 16 of enlarged diameter to receive the male member.

The diameter is enlarged further at 18 and a tapered portion 19 is provided, there being an O-ring 20 which normally rests at the larger diameter end of the taper and is prevented from moving further to the right in FIG. 1 by a step 25.

Rotatably attached to the body 1 is the housing 2 which has an inlet mouth 2a and is provided with a sleeve 21 which surrounds the body member and is provided with an annular portion 23 which can be swaged into a groove 24 on the body member so that the housing will rotate relative to the body member but cannot separate axially therefrom.

The housing is provided with tangential holes 26 which are aligned with an internal semi-circular groove 27 within the housing.

The male member 30 is shown attached to a hose 31 by a ferrule 32 in conventional manner. The male member further comprises an external groove which is made up of a semi-circular groove 33 and a cut-away portion 34. The male portion then has an outwardly extending annular abutment having a frusto-conical surface 35 on the side thereof facing the free end 30a, followed by a short portion 36 which is cylindrical and then has a further cylindrical surface 37 of lesser diameter than the portion 36.

Figure 3:
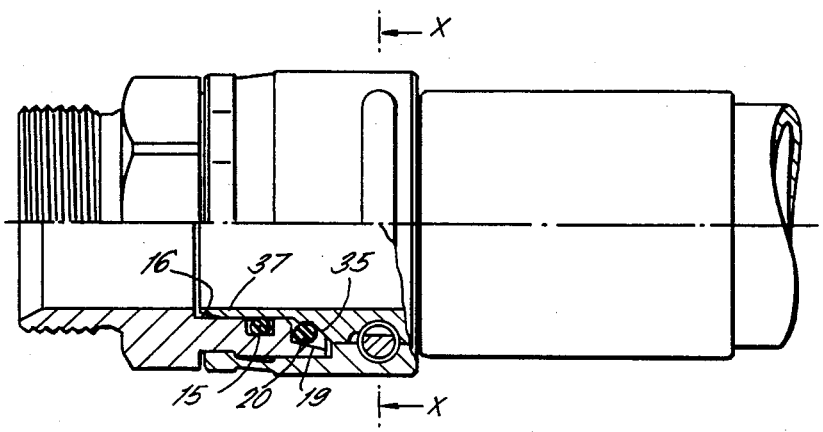
FIG. 3 is a view, partly in axial cross-section, of the male and female members in their position when the staple member can be inserted and retracted.
Figure 4:
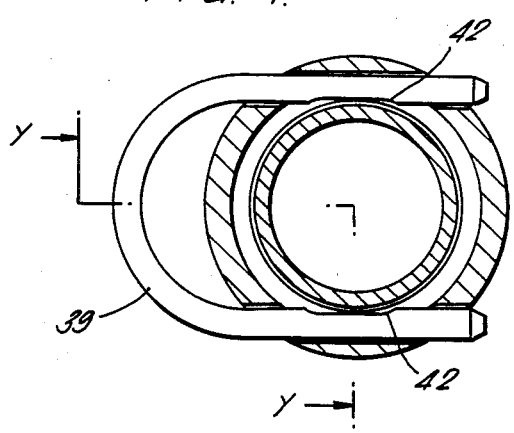
FIG. 4 is a cross-section on the line X—X in FIG. 3.

FIGS. 3 and 4 show the two members engaged together and a staple 39 inserted to engage the grooves in the male and female members. It will be seen that the portion 37 is received within the reduced diameter portion 16 of the female member so that the internal bore of the joined couplings is approximately the same diameter.

It will also be seen that the O-ring 15 makes sealing engagement with the male member and that the O-ring 20 has been rolled along the tapered surface 19 by the tapered surface 35 and has been obliquely compressed in section between these tapered surfaces. Thus, in this position the O-ring is compressed and rolled out of its normal configuration and tends to roll back down the tapered surfaces to force the male and female members apart.

Figure 5:
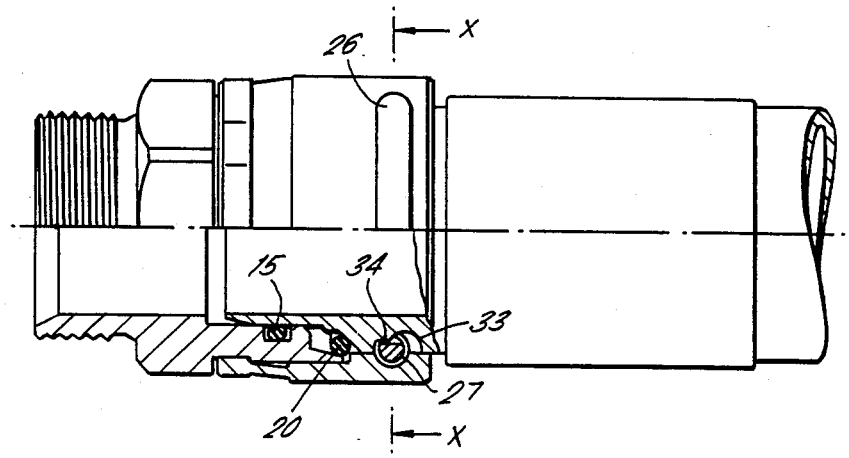
FIG. 5 is a view, partly in axial cross-section, of the two members in the locked position where the staple may not be withdrawn.
Figure 6:
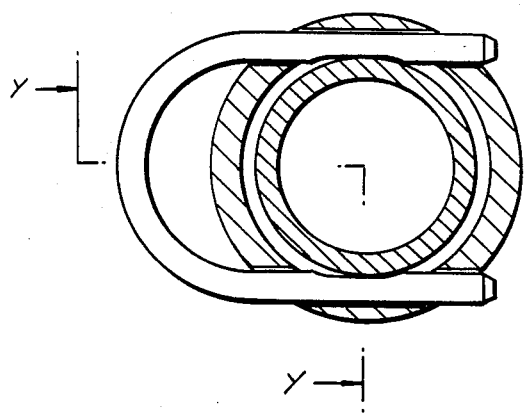
FIG. 6 is an axial cross-section on the line X—X in FIG. 5.

It will be seen that the limbs of the staple are both recessed at 42, and referring now to FIGS. 5 and 6, it will be seen that the two members are moved apart under the action of the O-ring 20 to a position where it is impossible to retract the staple. This is because the staple is now received in the groove 34 rather than in the semi-circular groove 33, and as it is only the recessed portion of the staple which can be received in this groove, the ends of the limbs of the staple cannot be withdrawn.

This means that, in order to withdraw the staple, the two parts of the coupling have to be forced back to the position shown in FIGS. 3 and 4, and this cannot be done while pressure is existing within the coupling. The pressure within the coupling will tend to force the two parts of the coupling apart, and in order to press the two parts together it will be necessary to use a force equivalent to the product of the pressure and the cross sectional area sealed within the coupling.

Figure 7A:
Figure 7B:

Quite clearly, many variations are possible within the scope of the invention. For example, the staple may be of square section, in which case the other parts of the coupling would be shaped accordingly. This arrangement is shown in FIGS. 7a and 7b.

Figure 8A:
Figure 9A:
Figure 8B:
Figure 9B:

It is also possible to provide the cut-outs on the staple on the sides of the limbs, and this is shown in FIGS. 8a and 8b in the case of a circular staple and in FIGS. 9a and 9b in the case of a rectangular sectioned staple.

Figure 10A:
Figure 11A:
Figure 10B:
Figure 11B:

FIGS. 10 and 11 show further variations to the manner in which the staple may be provided with cut-outs.

As an alternative to the separating resilient means provided by the O-ring 20 running along the two tapered surfaces, any other form of spring means could be used. This could be done by rings with a buffer type function without a rolling action or by metal springs such as compression coils, wavy washers or conical disc-type springs. Alternatively, the elastomeric springing could be provided by the fluid seal itself.

Quite clearly, the female member could be formed as a single member, in which case the positions of the holes for receiving the staple could not be rotated. If the seal provided by the O-ring 15 were to have the dual function of sealing and separating the two members, it could with advantage be positioned on the male member.

It is also possible to have the holes on the female member provided as described in British Pat. No. 1,253,981.

We claim:

1. In a releasable fluid coupling which includes interengageable male and female members, said male member having an outer surface with a groove therein and said female member having an inner surface with a groove therein, said grooves being aligned when said male and female members are fully engaged together, said female member including holes extending therethrough which are aligned with the groove on the inner surface thereof; a sealing means for providing a fluid-tight connection between said male and female members; and a generally U-shaped staple having legs, the legs of said generally U-shaped staple being insertable through the holes in said female member and along the aligned grooves in the outer and inner surfaces of said male and female members when said male and female members are fully engaged together to keep said male and female members from becoming fully separated, the improvement wherein said releasable fluid coupling includes a biasing means located between said male and female members to urge them apart and wherein the legs of said generally U-shaped staple have recesses therein, and wherein said male member has means cooperable with said recesses such that, after being inserted through said holes in said female member and along the aligned grooves in the outer and inner surfaces of said male and female members when said members are fully engaged together and once said biasing means has urged them apart, said generally U-shaped staple cannot be removed from between said male and female members.

2. The releasable fluid coupling as defined in claim 1, wherein said male member includes a free end and wherein said cooperable means of said male member includes a cut-away portion of said outer surface adjacent the groove therein on the side thereof nearest said free end, said cut-away portion being cooperable with the recesses in the legs of said generally U-shaped staple to prevent said generally U-shaped staple from being removed from said male and female members when said biasing means has urged said male and female members apart.

3. The releasable fluid coupling as defined in claim 2, wherein both said groove and said cut-away portion on the outer surface of said male member extend around the circumference of said male member.

4. The releasable fluid coupling as defined in claim 3, wherein said groove on the outer surface of said male member has a semi-circular cross section.

5. The releasable fluid coupling as defined in claim 4, wherein said groove on the inner surface of said female member has a semi-circular cross section.

6. The releasable fluid coupling as defined in claim 3, wherein said groove on the outer surface of said male member has a rectangular cross section.

7. The releasable fluid coupling as defined in claim 1, wherein said biasing means comprises an O-ring.

8. The releasable fluid coupling as defined in claim 1, wherein said male member has a free end and the outer surface thereof includes an outwardly extending annular abutment which provides a frusto-conical surface on the side thereof facing said free end, wherein said female member has an inlet mouth and the inner surface thereof includes a frusto-conical surface which is cooperable with the frusto-conical surface on the outer surface of said male member, and wherein said O-ring is located between said cooperable frusto-conical surfaces so as to be obliquely compressed therebetween.

9. The releasable fluid coupling as defined in claim 1, wherein the legs of said generally U-shaped staple have facing sides and wherein the recesses in said legs are in said facing sides thereof.

10. The releasable fluid coupling as defined in claim 1, wherein said female member includes a body member and a housing member which is rotatably connected to said body member, and wherein said groove on the inner surface of said female member and said holes therethrough are located in said housing member.

* * * * *